(12) United States Patent
Waterson et al.

(10) Patent No.: US 11,813,602 B2
(45) Date of Patent: Nov. 14, 2023

(54) POLYMERISATION METHOD AND APPARATUS THEREFOR

(71) Applicant: INNOSPEC LIMITED, Ellesmere Port (GB)

(72) Inventors: Carl Waterson, Ellesmere Port (GB); Richard David Hayton, Ellesmere Port (GB); Ian Malcolm McRobbie, Ellesmere Port (GB)

(73) Assignee: INNOSPEC LIMITED, Ellesmere Port (GB)

( * ) Notice: Subject to any disclaimer, the term of this patent is extended or adjusted under 35 U.S.C. 154(b) by 122 days.

(21) Appl. No.: 17/428,103

(22) PCT Filed: Jan. 31, 2020

(86) PCT No.: PCT/GB2020/050234
§ 371 (c)(1),
(2) Date: Aug. 3, 2021

(87) PCT Pub. No.: WO2020/161473
PCT Pub. Date: Aug. 13, 2020

(65) Prior Publication Data
US 2022/0055003 A1   Feb. 24, 2022

(30) Foreign Application Priority Data

Feb. 4, 2019 (GB) ...................... 1901496

(51) Int. Cl.
*B01J 8/04* (2006.01)
*B01J 8/00* (2006.01)
(Continued)

(52) U.S. Cl.
CPC ............. *B01J 8/0492* (2013.01); *B01J 8/001* (2013.01); *C08F 2/02* (2013.01); *C08F 4/6428* (2013.01); *C08F 210/02* (2013.01)

(58) Field of Classification Search
CPC ....... B01J 8/00; B01J 8/001; B01J 8/02; B01J 8/04; B01J 8/0492; B01J 19/00;
(Continued)

(56) References Cited

U.S. PATENT DOCUMENTS 3,933,263 A   1/1976   Frew et al.
4,008,347 A   2/1977   Amberg et al.
(Continued)

FOREIGN PATENT DOCUMENTS

CN   1500814 A   6/2004
CN   101886740 B   10/2012
(Continued)

OTHER PUBLICATIONS

GB Search Report for GB App No. GB1901499.2, dated Jul. 29, 2019 (4 pages).
(Continued)

*Primary Examiner* — Natasha E Young
(74) *Attorney, Agent, or Firm* — Shumaker, Loop & Kendrick, LLP

(57) ABSTRACT

A method of assembling and/or operating apparatus for undertaking a chemical reaction. The apparatus includes a housing in which a precursor of a receptacle is arranged. A fluid (F1) may be introduced into said precursor to cause the precursor to inflate.

24 Claims, 8 Drawing Sheets

(51) Int. Cl.
*C08F 2/02* (2006.01)
*C08F 4/642* (2006.01)
*C08F 210/02* (2006.01)

(58) Field of Classification Search
CPC .... B01J 19/0006; B01J 19/0013; B01J 19/24; B01J 19/241; B01J 2219/00; B01J 2219/00049; B01J 2219/00051; B01J 2219/00074; B01J 2219/00076; B01J 2219/00085; B01J 2231/00; B01J 2231/10; B01J 2231/12; B01J 2231/122; C09K 3/00; F17D 1/00; F17D 1/08; F17D 1/16; F17D 1/17
See application file for complete search history.

(56) References Cited

U.S. PATENT DOCUMENTS

| | | | |
|---|---|---|---|
| 4,016,894 A | 4/1977 | Baldwn et al. | |
| 4,446,092 A * | 5/1984 | Bliley | B29C 70/342 264/258 |
| 4,527,581 A | 7/1985 | Motier | |
| 5,002,203 A | 3/1991 | Einer | |
| 5,504,131 A | 4/1996 | Smith et al. | |
| 5,504,132 A | 4/1996 | Smith et al. | |
| 6,649,670 B1 | 11/2003 | Harris et al. | |
| 6,906,150 B2 | 6/2005 | Kimmareddi et al. | |
| 7,534,403 B2 | 5/2009 | Eaton et al. | |
| 7,582,708 B2 | 9/2009 | Eaton et al. | |
| 8,105,547 B2 | 1/2012 | Eaton et al. | |
| 8,110,150 B2 | 2/2012 | Eaton et al. | |
| 10,836,848 B2 | 11/2020 | Paley et al. | |
| 2002/0065202 A1 | 5/2002 | Eaton et al. | |
| 2004/0167297 A1 | 8/2004 | Kommareddi et al. | |
| 2005/0239198 A1 | 10/2005 | Kunas et al. | |
| 2006/0293196 A1 | 12/2006 | Harris et al. | |
| 2008/0014395 A1 | 1/2008 | Kitahara | |
| 2014/0051610 A1 | 2/2014 | Perry et al. | |
| 2014/0151321 A1 | 6/2014 | Chang et al. | |
| 2017/0189837 A1 | 7/2017 | Herold et al. | |
| 2018/0119084 A1 | 5/2018 | Tuohey et al. | |
| 2019/0015799 A1 | 1/2019 | Gebauer et al. | |

FOREIGN PATENT DOCUMENTS

| | | |
|---|---|---|
| CN | 102731695 A | 10/2012 |
| CN | 103300646 A | 9/2013 |
| CN | 107266632 A | 10/2017 |
| CN | 10843617 A | 8/2018 |
| EP | 1876962 A2 | 1/2008 |
| JP | 2000141478 A | 5/2000 |
| WO | 9932281 A1 | 7/1999 |
| WO | 99/60038 A1 | 11/1999 |
| WO | 02/34802 A1 | 5/2002 |
| WO | 2009055112 A1 | 4/2009 |
| WO | 2013/106809 A1 | 7/2013 |
| WO | 2015/039034 A1 | 3/2015 |
| WO | 2016053956 A1 | 4/2016 |
| WO | 2016/169803 A1 | 10/2016 |
| WO | 2017/118643 A1 | 7/2017 |
| WO | 2018217122 A1 | 11/2018 |
| WO | 2019245889 A1 | 12/2019 |
| WO | 2020079148 A1 | 4/2020 |

OTHER PUBLICATIONS

GB Search Report for GB App No. GB1901494.3, dated Jul. 31, 2019 (5 pages).
GB Search Report for GB App No. GB1901496.8, dated Aug. 1, 2019 (3 pages).
GB Search Report for GB App. No. GB1901503.1, dated Aug. 1, 2019 (3 pages).
GB Search Report for GB App No. GB2001370.2, dated Jun. 24, 2020 (5 pages).
GB Search Report for GB App. No. GB2001371.0, dated Jul. 20, 2020 (4 pages).
GB Search Report for GB App No. GB2001376.9, dated Jul. 20, 2020 (4 pages).
GB Search Report for GB App No. GB2001374.4, dated Jul. 30, 2020 (5 pages).
International Search Report (ISR) for PCT/GB2020/050233 dated Apr. 9, 2020 (5 pages).
Written Opinion for PCT/GB2020/050233 dated Apr. 9, 2020 (4 pages).
International Search Report (ISR) for PCT GB2020/050236 dated Mar. 23, 2020 (3 pages).
Written Opinion for PCT GB2020/050236 dated Mar. 23, 2020 (5 pages).
International Search Report (ISR) for PCT GB2020/050234 dated May 18, 2020 (5 pages).
Written Opinion for PCT GB2020/050234 dated May 18, 2020 (5 pages).
International Search Report (ISR) for PCT GB2020/050235 dated Apr. 9, 2020 (3 pages).
Written Opinion for PCT GB2020/050235 dated Apr. 9, 2020 (6 pages).
Non-Final Office Action (NFOA) issued for U.S. Appl. No. 17/428,100 dated Mar. 16, 2023 (17 pages).
Final Rejection issued for U.S. Appl. No. 17/428,100 dated Aug. 15, 2023 (14 pages).

* cited by examiner

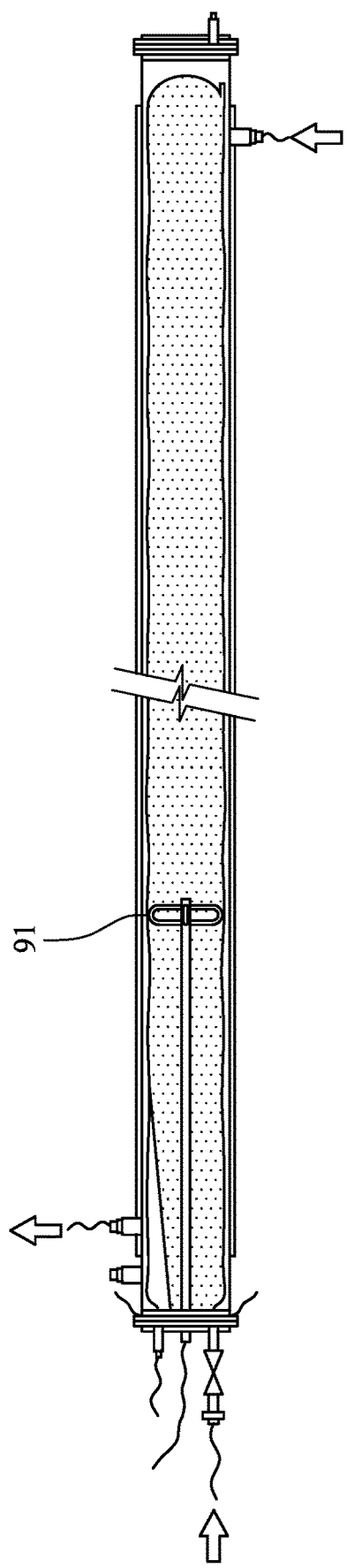
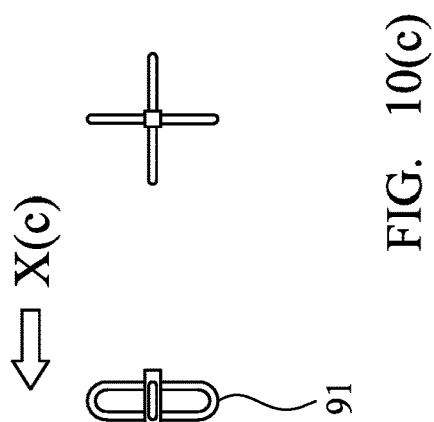
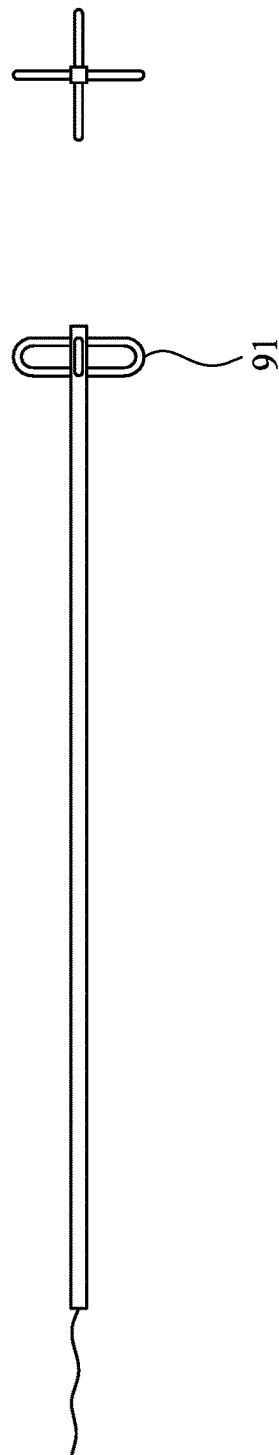
FIG. 10(a)
FIG. 10(b)
FIG. 10(c)

POLYMERISATION METHOD AND APPARATUS THEREFOR

This application is a national stage application claiming priority to PCT/GB2020/050234, now WO2020/161473, filed on Jan. 31, 2020, which claims priority to Great Britain Patent Application Serial No. GB 901496.8, filed on Feb. 4, 2019.

TECHNICAL FIELD AND BACKGROUND

This invention relates to chemical reactions, and particularly, although not exclusively, relates to reactions for preparing polymers. Preferred embodiments relate to the assembly and/or operation of apparatus for carrying out a chemical reaction, for example a polymerisation reaction. Preferred embodiments relate to drag reducing polymers and uses thereof in drag reduction e.g. to reduce the effect of friction ("drag") experienced by a liquid hydrocarbon flowing through a hydrocarbon transportation pipeline.

The use of polymers and/or copolymers of alpha-olefins to reduce the effect of friction ("drag") experienced by a liquid hydrocarbon flowing through a hydrocarbon transportation pipeline is well-known in the art. Reduction of the drag decreases the amount of energy needed to accomplish such flow, and therefore also decreases the costs associated with pumping. These materials, often called drag reducing agents (DRAs), can take various forms, including certain polymers in oil soluble suspensions, emulsions, pellets, gels, microfine powders and particulate slurries, for example comprising aqueous, organic or mixed aqueous/organic solvents. In some cases, the DRA may comprise a 'true' solution in an appropriate carrier solvent (e.g. dilute polymer solution product, produced in a solution polymerisation process). However, particulate slurries that comprise ground polymers are often the least expensive form.

The polymers that are most commonly used in preparing DRAs are poly(alpha-olefins) of carbon chain lengths ranging from 2 to about 40. Typically these polymers are prepared using Ziegler-Natta catalysts and frequently also co-catalysts such as alkyl aluminium compounds. These polymerization reactions tend to be very efficient, producing relatively high yield when carried out in bulk. However, they also tend to be highly exothermic. The exotherm itself creates problems which reduce the usefulness of the product if the exotherm is not effectively managed. These problems include, but are not necessarily limited to, a substantial reduction in the polymer molecular weight. This can substantially reduce the efficacy of the polymer in a drag reducing agent formulation.

Various different types of apparatus have been described for producing polymers and/or copolymers of alpha-olefins as described below.

U.S. Pat. Nos. 5,504,132 and 5,504,131 describe the preparation and use of non-crystalline high molecular weight hydrocarbon soluble drag reducing polymers. The documents describe suitable polymerization reaction vessels as being polymeric bottles and bags. It is stated the invention there described has been demonstrated with bottles and bags containing five to seven layers, including a water impervious polyolefin such as polypropylene, polyethylene, polybutylene, a bonding polymer, and ethylene vinyl alcohol copolymer oxygen barrier, another bonding polymer, and externally coated with polyethylene, polypropylene or polybutylene. Use of polyethylene terephthlate as an additional layer to add reactor strength at high temperatures is stated to be most preferred. One disadvantage of use of the bottle and bag described is that the produced poly(alpha-olefin) polymer is extremely adherent to the walls of the reactor vessels. As a result, the polymeric vessels cannot be separated from the poly(alpha-olefin) polymer. Instead, the bottles or bags are ground together with the polymer in forming the drag reducing material. This is, however, disadvantageous and undesirable—the material of the bottles or bag may contaminate downstream processes or products, for example within oil refineries. When contamination reaches the refined fuel, adverse effects such as filter blockages may occur in the end fuel application.

U.S. Pat. Nos. 7,534,403, 7,582,708, 8,105,547 and 8,110,150 describe polymerization reactors for creating drag-reducing polymers. The reactors are said to address the problem of removal of heat from the DRA polymerization reactor without the addition of cooling additives. The solution to the problem involves use of a reactor which includes a reservoir which incorporates an array of plates which define a heat exchanger. In one embodiment, seventeen, 4 feet heat exchanger plates are spaced apart by $4^{13}/_{16}$ inches. Disadvantageously, it is difficult using the apparatus to achieve consistent product quality, due to the dimensions and it may be difficult to separate the polymer from the heat exchanger plates.

U.S. Pat. No. 6,649,670B describes continuous polymerization and ambient grinding methods for polyolefin drag reducing agents. In one embodiment, there is described a continuous polymerization method which involves a "form, fill and seal" packaging process. Polymerization apparatus may comprise a continuous stirred tank reactor (CSTR) where raw materials (e.g. monomers. and catalysts) are continuously charged, allowed an appropriate dwell or residence time in the reactor system, such that adequate molecular weight or viscosity is sustained and, subsequently, discharged in a continuous fashion to a "form, fill and seal" packaging device. The packaging device may form bags which serve as temporary and isolated reactor vessels which are collected, kept in the presence of an inert atmosphere and reactants allowed to polymerise to high conversion.

U.S. Pat. No. 6,906,150 discloses a method of preparing polymers which are drag reducing agents. The method comprises allowing a polymerization mixture to polymerize in at least one closed reaction chamber configured as a linear void space with a linear axis and a cross-section and first and second ends, where the linear void space is surrounded by a chamber wall having an inner chamber surface and an outer heat exchange surface. Coolant is passed over the outer heat exchange surface to remove heat therefrom. The ends of the reaction chamber are opened and essentially all of the polymer is removed from each reaction chamber with a harvesting plunger. The harvesting plunger travels along the linear axis of the void space from the first end to the second end thereof. However, use of harvesting plungers is impractical as apparatus comprising such plungers is expensive to manufacture, the plungers are not very effective for removing the solid polymer from the reaction chambers and, furthermore, cleaning of the apparatus ready for recharging of the reaction chambers is time-consuming and difficult.

SUMMARY

It is an object of the present invention to address problems associated with manufacture of drag reducing polymers which may be advantageous.

According to a first aspect of the invention, there is provided a method of assembling and/or operating apparatus for carrying out a chemical reaction, the method comprising the steps of:
(i) selecting a housing in which a precursor of a receptacle is arranged; and
(ii) introducing a fluid (F1) into said precursor of said receptacle to cause the precursor to distend (e.g. inflate) to define a distended receptacle for receiving reagents for reaction in the apparatus.

Said housing is preferably arranged to support the precursor of said receptacle and/or said distended receptacle. In step (i), the precursor of said receptacle is preferably substantially flaccid. Preferably, the flaccid receptacle rests upon a surface of the housing which suitably supports it. Preferably said surface is a substantially horizontal surface or is angled at up to 10° (e.g. up to 5°) to the horizontal. Preferably, the flaccid receptacle rests upon one or more surfaces of the housing which suitably support it. Preferably said surface(s) are substantially horizontal surface(s) or are angled at up to 45°, such as up to 40°, or 30° or most preferably up to 10° (e.g. up to 5°) to the horizontal.

Preferably, said precursor of said receptacle has a length (L) and, preferably, in the combination described in step (i), at least 60%, at least 80%, or at least 90% of the length (L) of the precursor of said receptacle is contacted and/or supported by a surface of the housing.

Preferably, said housing is elongate and, in the combination described in step (i), length (L) of the precursor of the receptacle extends at least 60%, at least 80%, or at least 90% along the elongate extent of an internal region of the housing in which said precursor of said receptacle is arranged.

Preferably, said housing has a volume in which said precursor of the receptacle is arranged, wherein, in the combination described in step (i), said precursor of the receptacle occupies less than 70% of said volume for example less than 55%, or less than 30%. In some embodiments said precursor of the receptacle occupies less than 20%, suitably less than 10% or less than 5% of said volume.

In the combination described in step (i), said precursor of the receptacle is preferably secured in position, suitably relative to the housing. It is preferably secured in position at one end of the precursor of the receptacle, which end is preferably an open end of the precursor of the receptacle and/or an end of the precursor of the receptacle in which fluid may be introduced, for example in step (ii) of the method.

Said precursor of said receptacle is preferably not self-supporting. It is preferably flaccid unless inflated or otherwise supported by external means, for example a support surface of said housing.

Said precursor of said receptacle preferably comprises a plastic material (e.g. a polymeric material), for example a plastic film material. Said film material may have a thickness of at least 20 μm, suitably at least 50 μm, preferably at least 100 μm.

The thickness of the film material may be less than 2000 μm, preferably less than 1000 μm, more preferably less than 500 μm. The internal wall area of the precursor of said receptacle (and/or the distended receptacle of step (ii)) may be defined as the area of the receptacle which is arranged to contain material (e.g. polymer in use). Suitably, at least 50%, preferably at least 75%, more preferably at least 90%, especially about 100% of the internal wall area is defined by a said plastic film material having a thickness in the range defined. The thickness of the film material may be between 20 μm and 1000 μm, preferably between 50 μm and 500 μm.

The internal wall area of the precursor of the receptacle as described is preferably defined by a plastic film material which consists of a single layer. Thus, the precursor of the receptacle preferably does not comprise a laminate and/or a multi-ply material. Said internal wall area of the precursor of the receptacle preferably has a substantially smooth surface.

An external wall area of the precursor of the receptacle, being the wall area of the precursor of the receptacle on an opposite side of the film material to that of the internal wall area, preferably has a substantially smooth surface as described for that of the internal wall area. Said internal wall area and said external wall area preferably consist of identical materials and, preferably, represent opposing surfaces of the same material.

Preferably, substantially the entirety of said precursor of the receptacle comprises said plastic material, more preferably said plastic film material as described.

As described, said precursor of the receptacle preferably comprises a plastic material, for example a plastic film material. Suitably, at least 90 wt %, preferably at least 95 wt %, more preferably 100 wt % of said precursor of the receptacle is made up of said plastic material.

Said plastic material is suitably sufficiently strong and inert to withstand the polymerisation reaction and not to adhere significantly to the polymer as it is forming. It is also preferably relatively cheap, so it can be discarded after use. Said plastic material is preferably heat sealable. It is preferably a thermoplastic polymer. It is preferably chemically compatible with the reagents used and polymer produced in the polymerisation reaction. Said plastic material preferably comprises optionally-substituted, preferably unsubstituted, alkylene (e.g. ethylene) repeat units which may be components of a homopolymer or copolymer. Said plastic material preferably comprises an optionally-substituted, preferably unsubstituted, polyolefin polymer, such as a polyalkylene polymer, for example polyethylene.

Said precursor of the receptacle preferably includes a first end and a second end which are spaced apart along the elongate extent of the precursor of the receptacle. Said first end is preferably a closed end and, more preferably, is substantially permanently closed—i.e. it is preferably not openable, except by, for example, destruction of the precursor of the receptacle. Said first end preferably includes a sealed, for example a heat sealed region, suitably whereby opposing walls of the precursor of the receptacle have been secured together, for example heat bonded together, thereby to define the closed end.

In the context of the present specification and unless the context otherwise requires, the diameter of the receptacle refers to the longest straight line passing from one side of the cross-section of the receptacle to an opposite side, when the receptacle is in a distended (e.g. inflated) state and/or when it is configured to define its maximum cross-sectional area.

In the context of a receptacle having a substantially symmetrical cross-sectional shape (e.g. having a substantially circular cross-section), the diameter of the receptacle refers to a straight line passing from one side to an opposite side of the receptacle, through the centre of the cross-section, when the receptacle is in a distended (e.g. inflated) state and/or when it is configured to define its maximum cross-sectional area.

Preferably, other than any means by which the first end of the precursor of the receptacle is arranged to define the closed end, preferably, the precursor of the receptacle includes no seams between said first and second ends. Said precursor of said receptacle is preferably formed from lay-flat tubing. It is preferably sealed at said first end as described and is divergent (e.g. by being splayed) at said second end, suitably as described herein.

Prior to step (i), the method may comprise a step (i)* which comprises selecting said housing and introducing said precursor of said receptacle into the housing, suitably to define the combination described in step (i).

When said precursor of said receptacle includes first and second ends which are spaced apart along the elongate extent of the precursor of the receptacle and wherein the first end is suitably a closed end, the method may include a step of selecting a precursor of said receptacle which includes a region adjacent said second end which diverges (or is suitably splayed), suitably so an opening of the receptacle at said second end (suitably via which fluid may be introduced into the precursor in step (ii) of the method) has a greater diameter than a region of the precursor inwards of the second end.

The length of the receptacle is suitably the linear distance between said first end and said second end. Preferably, the diameter of the precursor of the receptacle is substantially constant for at least 80% (preferably at least 90% or 95%) of the distance from the first end towards said second end. In a preferred embodiment, a region of the precursor of said receptacle adjacent said second end diverges (or is suitably splayed) so an opening of the precursor of said receptacle at said second end has a greater diameter than a region of the precursor of said receptacle inwards of the second end. Such an arrangement facilitates securement and sealing of the second end in position in a way which minimises creation of air gaps in use.

The diameter of the precursor of the receptacle may be in the range 1 cm to 45 cm across its entire extent. When the second end diverges as described, the maximum diameter of the divergent region may be up to 30% greater than the diameter of the receptacle upstream of the divergent region. The length of the precursor of the receptacle may be in the range 15 cm to 60 m.

In step (i)*, the method may comprise clamping the precursor of said receptacle in position. It is suitably clamped in position so the position of said precursor of said receptacle is fixed relative to that of said housing. A divergent end as described of said precursor of said receptacle is suitably clamped in position.

Step (ii) of the method may comprise introducing an inert fluid (F1), for example an inert gas such as nitrogen, into said precursor of said receptacle to cause the precursor of said receptacle to distend and suitably define a distended receptacle. The volume of the distended receptacle may be in the range 4000 cm$^3$ to 0.5 m$^3$. Preferably, the diameter of the distended receptacle (suitably across at least 80% of the length of the receptacle) is less than 30 cm. It is more preferably less than 11 cm. It may be at least 5 cm or at least 7 cm. The length of the distended receptacle is preferably in the range 3 m to 15 m, especially in the range 4 m to 11 m. The volume of the receptacle is preferably in the range 4000 cm$^3$ to 0.5 m$^3$, for example in the range 10000 cm$^3$ to 0.15 m$^3$, more preferably in the range 20000 cm$^3$ to 0.12 m$^3$. The diameter, length and/or volume are suitably selected as described to optimise the polymerisation process and/or curing of polymer within the receptacle. It is found that if the diameter, length and/or volume are too great, there may be insufficient heat transfer during the polymerisation. This may mean that the degree of polymerisation across the diameter and/or within the volume may be unacceptably variable which may result in production of an inferior drag reducing polymer.

The aspect ratio of the distended receptacle may be defined as the length of the internal volume of the receptacle divided by the diameter of the internal volume of the receptacle. Said aspect ratio may be at least 10, suitably at least 20, preferably at least 30. Said aspect ratio may be less than 600, preferably less than 300, more preferably less than 150. Said aspect ratio is preferably between 10 and 300, more preferably between 30 and 150.

The method preferably comprises introducing said inert fluid (F1), suitably so that it flushes fluid for example gas such as oxygen from the precursor of said receptacle, so that the level of oxygen within the distended receptacle after introduction of said fluid (F1), is less than a predetermined level. Thus, initially in step (ii), said inert fluid (F1) may drive gas (e.g. oxygen) from the precursor of said receptacle as it distends (e.g. is inflated). Thus, some of the fluid (F1) introduced into the precursor of said receptacle may pass out of the precursor of said receptacle in step (ii), suitably along with entrained oxygen.

Step (ii) may comprise introducing said fluid (F1) via a said second end of the precursor of the receptacle.

The method may include an optional step (iii) which comprises introducing a fluid (F2) into the housing, suitably between a wall of said housing and an outer surface of the precursor of said receptacle and/or said distended receptacle.

Fluid (F2) may be an inert fluid, for example an inert gas such as nitrogen.

Fluid (F2) is suitably arranged to inert a region around the precursor of said receptacle and/or said distended receptacle—i.e. to inert a region outside the volume of the precursor of said receptacle and/or said distended receptacle which receives fluid (F1) and/or reagents for reaction in the apparatus.

Step (iii) may be undertaken prior to, concurrent with, or subsequent to step (ii).

Said housing is preferably arranged to support the receptacle which is suitably arranged within the housing.

Said housing preferably includes cooling means for cooling reagents and polymer contained in the apparatus in use.

Said housing preferably includes inerting means for introducing and/or maintaining an inert atmosphere in and/or around the receptacle.

Said housing is preferably elongate. Said elongate housing preferably comprises a first elongate tube in which said precursor of said receptacle and/or said distended receptacle is positioned. In use (e.g. when inflated and/or when containing reagents for preparation of a polymer as herein described), said distended receptacle preferably contacts an internal surface of the first elongate tube. At least 60%, at least 75%, or at least 90% of the area of an external wall area of said distended receptacle preferably contacts said internal surface. Said distended receptacle preferably has a substantially circularly cross-section, for example along at least 50%, at least 75%, at least 90% or at least 95% of its length. The area of the cross-section of the distended receptacle may be substantially constant, for example along at least 50%, at least 75%, at least 90% or at least 95% of its length.

Preferably, said first elongate tube has a circular cross-section and said distended receptacle has a circular cross-section. The ratio of the maximum diameter of the distended receptacle divided by the diameter of the first elongate tube, suitably in a region wherein the first elongate tube and receptacle are opposite one another, may be at least 0.8, preferably at least 0.9, more preferably at least 0.95. Said ratio may be 1.2 or less, preferably less than 1.1, more preferably less than 1.05. Suitably the aforementioned ratios apply along at least 50% or at least 80% of the length of the distended receptacle. Thus, in a preferred embodiment, the ratio of the maximum diameter of the distended receptacle (measured at any position along at least 50% or at least 80% of the length of the receptacle) divided by the internal diameter of the first elongate tube at a position opposite the position at which the diameter of the first elongate tube is measured, is in the range 0.8 to 1.2, preferably in the range 0.95 to 1.1.

Said internal surface of said first elongate tube is preferably a substantially smooth surface; and/or preferably includes a relatively low coefficient of friction to enable the distended receptacle to slide over the internal surface, when urged to do so. Said internal surface is preferably uninterrupted across the majority (e.g. greater than 80% or greater than 90%) of its area. Said internal surface is preferably cylindrical, preferably circularly cylindrical. Said internal surface preferably has a constant cross-section along substantially its entire extent.

Said first elongate tube is preferably cylindrical, for example circularly cylindrical. Said first elongate tube is preferably rigid and/or self-supporting. It may be made of a metal, for example steel.

Said first elongate tube may include a port (A) through a wall thereof to allow fluid to pass into and/or out of the first tube in use. Said elongate tube may include one or a plurality of such ports.

Said elongate housing preferably comprises a second elongate tube which is suitably coaxial with said first tube and said first tube is suitably positioned within the second tube. Said first and second tubes are preferably radially spaced apart so an annular gap is defined between the first and second tubes, there suitably being spacer means to maintain the gap. Said annular gap preferably defines a fluid passage for a coolant fluid.

The annular gap preferably extends around substantially the entirety of the surface area of the first tube so that coolant fluid suitably contacts at least 20%, at least 50%, at least 70%, at least 80%, at least 90%, especially substantially the entirety of the surface area of first tube in use thereby to cool the first tube (and consequently the receptacle therewithin). Thus, the arrangement may define part of a or said cooling means for cooling reagents in the distended receptacle (e.g. the reagent-containing receptacle herein described) in use.

Said second tube is preferably cylindrical, for example circularly cylindrical.

Said second elongate tube is preferably rigid and/or self-supporting. It may be made of a metal, for example steel.

Said second elongate tube may include one or, preferably, a plurality of ports (e.g. a port (B) and a port (C)) through a wall of the second tube to allow fluid to pass into and out of the second tube (and suitably into and/or out of said annular gap), in use. The method may include the step of introducing a fluid (e.g. a coolant liquid, for example a mixture of ethylene glycol and water) via one or a plurality of said ports (e.g. port (B) and/or port (C)).

Said first elongate tube is preferably closed at a first end (which is suitably adjacent the first end of said precursor and/or distended receptacle) by a first end plate. The first end plate may include a port (e.g. port (D)) which extends therethrough to allow fluid to pass into and out of the first and/or second tubes.

Said elongate housing preferably includes securement means for releasably securing said precursor and/or distended receptacle in position, suitably within the first and/or second tubes as described. Thus, the housing is preferably arranged for removal of the elongate receptacle therefrom suitably after a polymer has been produced therein. In a preferred embodiment where the housing includes a first tube as described, the housing and/or first tube may be arranged for the receptacle to slide out of the first tube and thereby removed and/or disengaged therefrom.

Said securement means may comprise a clamp for clamping the precursor of said receptacle and/or said distended receptacle in position. When the precursor of said receptacle includes a second end (which is suitably splayed as described), the securement means may clamp the second end and/or regions adjacent thereto in position. Said clamp may include a second end plate which is suitably arranged to be operatively connected to the first elongate tube (when provided) of the elongate housing.

Said second end plate may include one or a plurality of ports (e.g. ports (E) and (F)) which extend therethrough to allow fluid to pass into and/or out of the elongate housing and/or said precursor of said receptacle and/or said distended receptacle, in use.

Preferably in the method, the same port (e.g. port (E)) is used at different times to both introduce fluid (F1) into said precursor of said receptacle to cause it to distend (e.g. inflate) and subsequently to deliver reagents (e.g. monomer and/or catalyst) into the distended receptacle.

When said apparatus includes cooling means as described, said apparatus may include a container (C1) for containing a coolant fluid, wherein the apparatus is arranged for delivery of coolant fluid from the container (C1) to a region outside said distended receptacle and/or outside a reagent-containing receptacle. When the apparatus includes first and second tubes and an annular gap as described, said apparatus is preferably arranged to deliver coolant fluid from container (C1) into said annular gap. Coolant fluid may be circulated in use. The method preferably comprises circulating a coolant fluid within the apparatus (e.g. within said annular gap) thereby to cool reagents, for example monomers and a polymer formed therefrom. In the event it is desired to heat reagents in the receptacle, as an alternative, a heating fluid (e.g. having a temperature above ambient temperature) may be used instead of said coolant fluid. In some cases, at one time during a polymerisation reaction using the apparatus a coolant fluid may be supplied and, at another time, a heating fluid may be supplied.

As an alternative to provision of said second elongate tube which cooperates with said first elongate tube to define an annular gap for circulation of coolant fluid as described, an alternative cooling device may be used. This may comprise a cooling assembly including an elongate (e.g. substantially rectangular cross-section) tube which is arranged to be secured (for example releasably secured) adjacent an outside surface of the first elongate tube. The cross-section is suitably configured so that a face thereof can make intimate thermal contact (e.g. face to face contact) with the first elongate tube. Coolant fluid may be circulated in use through the rectangular cross-section tube thereby to cool the first elongate tube and, consequently, the receptacle in thermal contact therewith.

In one embodiment, said container (C1) contains coolant fluid for cooling reagents and/or polymer in the distended receptacle and/or a reagent-containing receptacle in use. Said container (C1) is preferably operatively arranged, suitably via a pipe, to deliver coolant fluid into said annular gap.

Said apparatus may include a container (C2) for containing a monomer, wherein the apparatus is arranged for delivery of monomer into the receptacle. In one embodiment, said container (C2) contains monomer for delivery into the receptacle. The method preferably comprises, after step (ii), introducing one or more monomers into the distended receptacle, suitably to define a reagent-containing receptacle. Said container (C2) is preferably operatively arranged, suitably via a pipe, to deliver monomer into said receptacle.

Said apparatus may include a container (C3) for containing a catalyst, wherein the apparatus is arranged for delivery of catalyst into the receptacle. In one embodiment, said container (C3) contains catalyst for delivery into the receptacle. The method preferably comprises, after step (ii), introducing a catalyst into the distended receptacle, suitably to define a reagent-containing receptacle. Said container (C3) is preferably operatively arranged, suitably via a pipe, to deliver catalyst into said receptacle.

Containers (C2) and (C3) may be arranged to deliver the monomer and catalyst respectively to a mixing region where they are contacted and mixed, wherein the mixing region is upstream of said receptacle. A pipe suitably is operatively arranged to deliver a mixture comprising monomer and catalyst from said mixing region into said receptacle. Thus, the method preferably comprises mixing monomer and catalyst upstream of said distended receptacle and introducing said mixture, after step (iii), into the distended receptacle.

The apparatus may include a mixing device for mixing monomer and catalyst and, preferably, said mixing device is provided upstream of said distended receptacle.

Said apparatus may include a container (C4) for containing an inert fluid (e.g. an inert gas such as nitrogen), wherein the apparatus is arranged to deliver the inert fluid into the apparatus and/or into the receptacle for inerting the apparatus and/or receptacle. In one embodiment, said container (C4) contains inert fluid. Said container (C4) is preferably operatively arranged, suitably via a pipe, to deliver inert fluid for inerting the apparatus and/or receptacle.

The method may include a step (iv) which comprises introducing reagents (e.g. at least one monomer and at least one catalyst) for preparation of a polymer into said distended receptacle of said apparatus.

The method may comprise controlling conditions around said distended receptacle for controlling the polymerisation of said reagents therewithin.

The method may comprise a step (v) which comprises operating a said cooling means to cool the reagents and/or polymer in the reagent-containing receptacle during polymerisation.

The method is preferably for carrying out a polymerisation reaction.

The total weight of reagents introduced into said distended receptacle may be at least 12 g, is suitably at least 1000 g, is preferably at least 10000 g, is more preferably at least 20000 g and, especially, is at least 30000 g. The total weight may be less than 3300 kg, suitably less than 1000 kg, preferably less than 500 kg, more preferably less than 250 kg, especially less than 100 kg. The total weight of reagents introduced into said distended receptacle may be between 1000 g and 250 kg, preferably between 10000 g and 100 kg.

The polymer produced in the method may be any conventional or known polymeric drag reducing agent (DRA) including, but not limited to, poly(alpha-olefin), polychloroprene, vinyl acetate polymers and copolymers, poly(alkylene oxide) (PAO), and mixtures thereof and the like. In one embodiment, the monomer may be any monomer which, when polymerized, forms a polymer suitable for use as a drag reducing agent (DRA). Said at least one monomer may comprise an alpha-olefin. Preferred alpha-olefins may have a carbon chain length in the range 2 to 40 carbon atoms, preferably 4 to 25, more preferably 6 to 12 carbon atoms. Said at least one monomer may be selected from the group comprising: 1-hexene, 1-heptene, 1-nonene, 1-octene, 1-decene, 1-dodecene, 1-tetradecene, isobutylene; alkyl acrylates; alkylmethacrylates; styrene and alkyl styrene. Copolymers (which may include two or more dissimilar monomers) of these monomers may also make suitable drag reducing agents. Preferred monomers include alpha-olefins with a carbon chain length in the range 4 to 25, more preferably 6 to 12 carbon atoms. Preferred monomers are selected from the group comprising: 1-hexene, 1-heptene, 1-nonene, 1-octene, 1-decene, 1-dodecene, 1-tetradecene, isobutylene. An especially preferred monomer is 1-decene.

Preferred copolymer drag reducing agents may comprise repeat units derived from 1-decene, optionally (but preferably) in combination with repeat units from one or more further monomers. Such further monomers may be selected from 1-hexene, 1-octene and 1-dodecene, for example in a molar ratio of 1:9 to 9:1. An especially preferred copolymer drag reducing agent may be prepared from a monomer mixture comprising 1-hexene and 1-decene.

Any known suitable catalyst and/or co-catalyst may be used in the method as long as they sufficiently catalyse the reaction to a sufficient extent. Metallocenes are useful catalysts for polymerizing some monomers. In the case of alpha-olefins, polymerization may be conducted by the inclusion of a mixture of Ziegler-Natta catalyst and co-catalyst(s) into the monomer. Catalysts for the polymerization of alpha-olefins include, but are not necessarily limited to, powdered catalyst $TiCl_3 \cdot AA$ (aluminum activated titanium trichloride); co-catalyst(s), diethylaluminum chloride (DEAC), and diethylaluminum ethoxide (DEALE); TEAL (triethyl aluminum chloride), tri-methyl aluminum, tri-isobutyl aluminum, MAO (methylaluminoxane), haloalkanes (e.g. 1, 2-dichlorethane) and the like. Of course, it will be necessary to match the co-catalyst with the main catalyst, so that the catalytic activity of the main catalyst is triggered only by the presence of a particular co-catalyst or class thereof.

The method may comprise, after introduction of reagents into the distended receptacle in step (iv), closing off access to (e.g. sealing) the reagent-containing receptacle, except, optionally, for an inlet via which inert fluid, for example an inert gas such as nitrogen, is introduced into the receptacle, for example at a relatively low pressure (e.g. of about 0.5 psi). After step (iv), the method suitably comprises a polymerisation reaction which may be undertaken for a time of at least 10 hours, at least 1 day, at least 2 days, at least 3 days, at least 4 days or at least 5 days. Said time periods are suitably measured from completion of introduction of reagents into the distended receptacle, thereby to define said reagent-containing receptacle. Said polymerisation reaction is preferably undertaken for less than 20 days. After a selected time, polymer may be removed from the apparatus.

The method preferably includes a step of removing a receptacle containing polymer from said housing, suitably after step (iv). The method may comprise releasing said securement means, for example said clamp which clamps said receptacle in position. Thus, preferably, after polymer is prepared in said reagent-containing receptacle, a receptacle containing polymer may be withdrawn from the housing.

The method preferably comprises sliding the receptacle containing polymer out of the housing. It may be slid from the housing in the direction of the elongate extent of the housing. For example, when the housing includes a first elongate tube as described, said receptacle may be slid over an internal surface of said first tube, thereby to remove it from said first tube, suitably so that said receptacle is fully disengaged from all other parts of the apparatus.

Said method is preferably a batch process for example for producing 12 g to 3300 kg, preferably 20 kg to 100 kg, more preferably 30 kg to 50 kg of polymer, for example in said precursor of said receptacle.

The method may include a step of removing polymer from the receptacle in which it is prepared. Said method may comprise disengaging, for example, peeling the film of the receptacle away from the polymer. Advantageously, this may be achieved without leaving any film derived from the receptacle on the polymer. Thus, in a preferred embodiment, at least 95 wt %, preferably at least 99 wt %, more preferably 100 wt % of the film of the receptacle is disengaged from the polymer. Thus, the polymer may be isolated from the receptacle and, therefore, preferably includes less than 1 wt %, more preferably less than 0.1 wt %, especially substantially 0 wt % of film derived from said receptacle.

The method preferably comprises re-using the housing. For example the method may comprise engaging a new precursor of said receptacle with said housing and repeating the steps described to produce polymer in the new precursor of said receptacle. Said new precursor of said receptacle may have any feature of the precursor of said receptacle referred to above.

In an embodiment (I), the method of the first aspect may comprise the steps of:
(i) selecting a housing in which a precursor of a receptacle is arranged; and
(ii) introducing a fluid (F1) into said precursor of said receptacle to cause the precursor to distend (e.g. inflate) to define a distended receptacle for receiving reagents for reaction in the apparatus;
wherein the precursor of said receptacle comprises a single layer, polyalkylene film;
the thickness of said polyalkylene film is between 50 μm and 500 μm (e.g. between 125 μm and 500 μm);
the diameter of the precursor of a receptacle in its distended (e.g. inflated) state is between 7 cm and 25 cm (e.g. between 7 cm and 11 cm);
the length of the precursor of the receptacle is between 300 cm and 1500 cm; and
the precursor of the receptacle has a divergent region (e.g. at a second end of the precursor of a receptacle as described herein) which has a maximum diameter of up to 30% greater than the diameter of the precursor of the receptacle upstream of the divergent region.

In said embodiment (I), the method may include introducing reagents for reaction (e.g. polymerisation) in the apparatus, wherein suitably the reagents are as described herein.

According to a second aspect of the invention, there is provided apparatus for carrying out a chemical reaction, for example a polymerisation reaction, for example to produce a drag reducing polymer, said apparatus comprising a housing in which a distended (e.g. inflated) receptacle is arranged, wherein said distended receptacle is arranged to receive reagents for reaction (e.g. polymerisation) in the apparatus.

Said distended receptacle suitably includes a fluid (F1) which suitably is contained within the distended receptacle and/or which causes distension (e.g. inflation) of the receptacle.

The apparatus may be as described in the first aspect.
The housing may be as described in the first aspect.
Said distended receptacle and a precursor of said distended receptacle may be as described in the first aspect.

Said apparatus may include any feature of the apparatus of the first aspect and/or used in the method of the first aspect.

In one embodiment, said apparatus includes a container (C1) for containing a coolant fluid, wherein the apparatus is arranged for delivery of coolant fluid from the container (C1) to a region outside the distended receptacle. In one embodiment, said container (C1) contains coolant fluid for cooling reagents and/or polymer in the receptacle in use.

Said apparatus may include a container (C2) for containing a monomer, wherein the apparatus is arranged for delivery of monomer into the receptacle. In one embodiment, said container (C2) contains monomer for delivery into the receptacle.

Said apparatus may include a container (C3) for containing a catalyst, wherein the apparatus is arranged for delivery of catalyst into the receptacle. In one embodiment, said container (C3) contains catalyst for delivery into the receptacle.

Containers (C2) and (C3) may be arranged to deliver the monomer and catalyst respectively to a mixing region where they are contracted and mixed, wherein the mixing region is upstream of said receptacle.

The apparatus may include a mixing device for mixing monomer and catalyst and, preferably, said mixing device is provided upstream of said receptacle.

Said apparatus may include a container (C4) for containing an inert fluid (e.g. an inert gas such as nitrogen), wherein the apparatus is arranged to deliver the inert fluid into the apparatus and/or into the receptacle for inerting the apparatus and/or receptacle. In one embodiment, said container (C4) contains inert fluid.

The volume of the distended receptacle may be in the range 12 cm$^3$ to 4 m$^3$. Preferably, the diameter of the distended receptacle (suitably across at least 80% of the length of the receptacle) is less than 30 cm. It is more preferably less than 11 cm. It may be at least 7 cm. The length of the distended receptacle is preferably in the range 3 m to 15 m, especially in the range 4 m to 11 m. The volume of the receptacle is preferably in the range 10000 cm$^3$ to 0.15 m$^3$, more preferably in the range 20000 cm$^3$ to 0.12 m$^3$.

Any feature of any aspect of any invention or embodiment described herein may be combined with any feature of any aspect of any other invention described herein mutatis mutandis.

BRIEF DESCRIPTION OF THE DRAWINGS

Specific embodiments of the invention will now be described, by way of example, with reference to the accompanying drawings in which:

FIG. 10(a) is a representation of the apparatus of FIG. 1, but additionally including a thermocouple for monitoring temperature during the polymerisation process;

FIG. 10(b) is a representation of the thermocouple in side elevation;

FIG. 10(c) is an end view in the direction of arrow X(c) of FIG. 10(b); and

DETAILED DESCRIPTION

Figure 1:
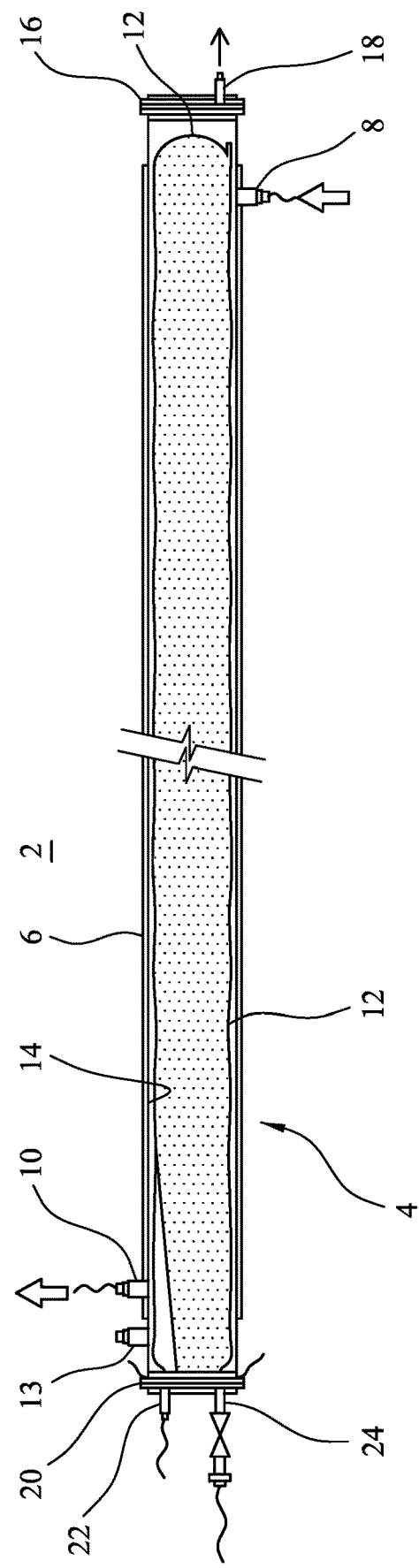
FIG. 1 is a schematic representation of apparatus for producing a polymer

In the Figures, the same or similar parts are annotated with the same reference numerals.

Referring to FIG. 1, apparatus 2 for carrying out a polymerisation reaction to produce, for example, a DRA involving monomer(s) and catalyst comprises a rigid elongate support tube assembly 4 which includes a coolant containing cooling jacket 6. The jacket 6 includes a coolant inlet 8 and a coolant outlet 10. Within the supporting tube assembly 4 is arranged an inflatable plastic reaction tube 12 (shown in a substantially filled state in FIG. 1) which abuts an internal wall 14 of the support tube assembly 4. End fitting 16 at one end of support tube assembly 4 includes a fluid port 18 via which an inert gas may exit the apparatus. End fitting 20 at an opposite end of support tube assembly 4 includes fluid ports 22, 24 in which fluids (e.g. monomer(s) and/or catalyst(s) and/or inert gas) may be introduced and/or removed from the apparatus during operation. In use of the apparatus, polymer is produced within the plastic reaction tube 12 while the tube 12 is cooled by contact with internal wall 14 of support assembly 4 which is cooled by coolant passing within cooling jacket 6 and while a positive pressure of inert gas is maintained around the tube 12. The contents of the plastic reaction tube may be maintained under inert gas conditions, through the application of inert gas via ports 22 and/or 24 while the polymerisation process is carried out. After completion of the polymerisation, end fitting 20 is removed and the plastic reaction tube 12 containing polymer produced is withdrawn from the assembly 4. The reaction tube 12 (i.e. the plastic material of which it consists) is disengaged, for example peeled, from the polymer to isolate the polymer from the reaction tube. The polymer may then be comminuted and formulated for use as a drag reducing additive.

Features of the apparatus and associated processes are described in greater detail below.

Figure 2A:
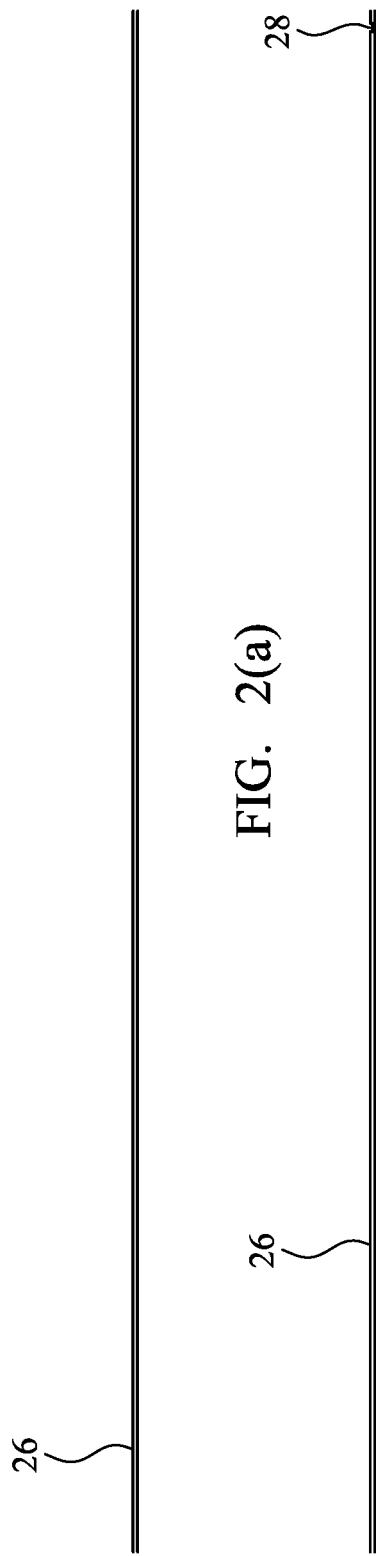
FIGS. 2(a) to 2(d) illustrate, in schematic cross-section, steps involved in producing a plastic reaction tube of the apparatus.
Figure 2B:
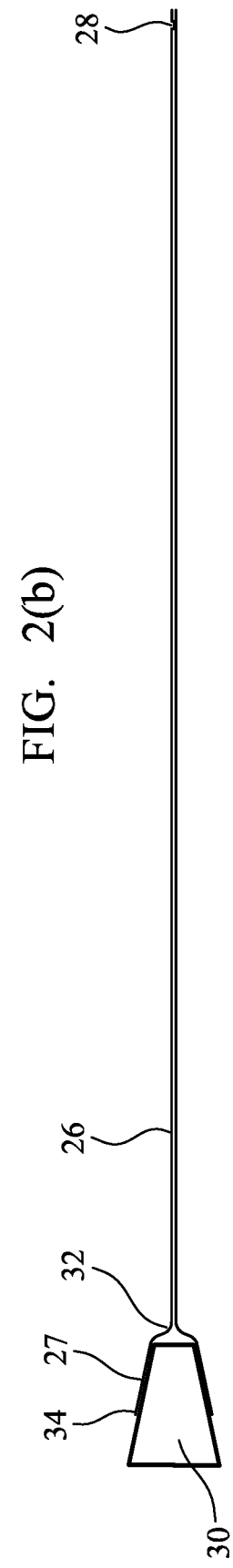
Figure 2C:
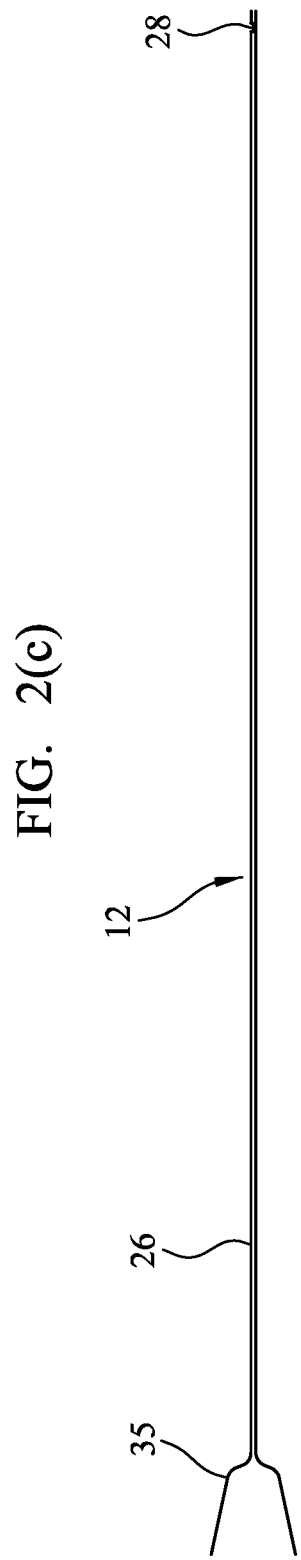
Figure 2D:

FIGS. 2(a) to (d) illustrate steps involved in producing the inflatable plastic reaction tube 12 which, in its finished state, is as represented in FIG. 2(d).

The reaction tube 12 is formed from 125 µm (500 gauge) lay flat, polyethylene tube 26 which is initially not closed at either end. The tube has a length of about 600 cm plus an additional 5 cm to 10 cm (to enable it to be clamped in position as described hereinafter) and a width of about 153 mm±5 mm when in its flattened state shown in FIG. 2(a).

In a first step, shown in FIG. 2(b), one end of the tube is heat sealed as represented by number 28, thereby to fully close off the end and define one closed end of a receptacle for a polymerisable mixture.

In a second step, shown in FIG. 2(c), open end of the tube 26 (opposite the closed end) is stretched (as illustrated by reference numeral 27) over a heated cone 30 thereby to splay the tube in a region thereof towards its open end. As a result, the diameter of the tube 26 adjacent its open end gradually increases on moving from region 32, inwards of the open end, to region 34, situated at said open end.

In a third step, shown in FIG. 2(d), the cone 30 and tube 26 are disengaged thereby to leave splayed open end 35 which has been permanently deformed by the heat treatment using the heated cone 30.

The open end is splayed as aforesaid to facilitate securement of the open end within the apparatus in such a way as to minimise air gaps between the plastic reaction tube 12 and associated fittings of the apparatus. If air was to become trapped within folds of the plastic reaction tube 12, such air could be detrimental to the polymerisation process and/or reagents used therein. In addition, the splaying facilitates production of a fluid-tight seal between the plastic tube and fittings of the apparatus.

The apparatus 2 may be assembled as described with reference to FIGS. 3(a) to 3(d).

Figure 3A:
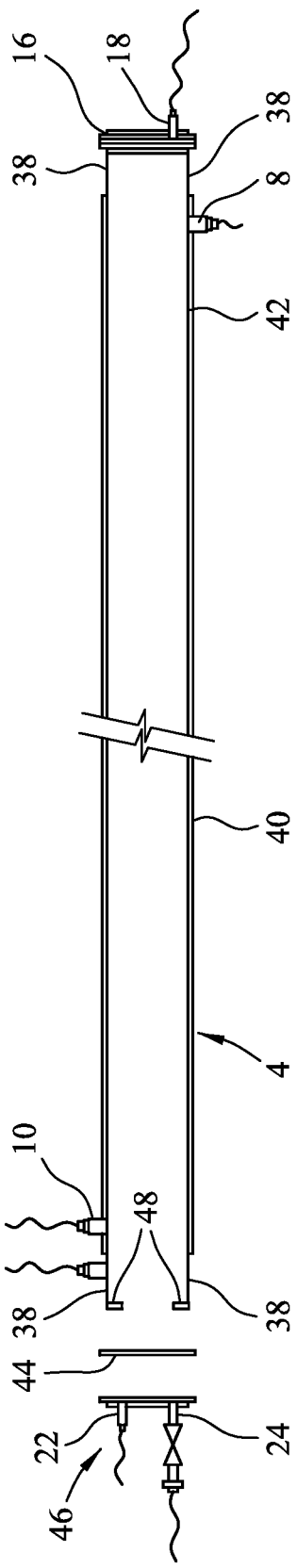
FIGS. 3(a) to 3(d) illustrate steps involved in assembling the apparatus, including the plastic reaction tube.

Referring to FIG. 3(a), support tube assembly 4 includes an inner rigid tube 38 arranged within an outer rigid tube 40. Spacers (not shown) are provided between tubes 38, 40 to maintain spacing therebetween thereby to define a passageway 42 between the tubes 38, 40 in which cooling fluid can flow. Ends of the outer rigid tube are welded to the outer surface of the inner rigid tube, to close the ends of the jacket assembly. Coolant inlet 8 communicates with the passageway 42 for passage of cooling fluid from the outside into the passageway 42 via the inlet 8 and out thereof via outlet 10. The cooling fluid can flow within the passageway around substantially the entirety of tube 38, before it exits the passageway via coolant outlet 10. Thus, a cooled, jacketed support tube assembly is arranged around the plastic reaction tube 12.

Inner tube 38 may suitably be made from stainless steel (e.g. SS304L) of thickness 0.083" (2.1 mm) and may have an outer diameter of 4" (101.6 mm). The length may be 20 ft (609.6 cm).

An inlet 13 (FIG. 1) is provided for introduction of gas into the inside of the inner tube 38 as described below.

Outer tube 40 may suitably be made from stainless steel (e.g. SS304L) of thickness 0.12" (3 mm) and may have an inner diameter of 108 mm and an outer diameter of 4.5" (114.3 mm). The length may be 19 ft 7½" (598.2 cm).

Coolant inlet 8 and outlet 10 may be fabricated with a 0.5" NPT Weldolet (Trade Mark). A push fit adaptor may be used to allow easy connection or removal of tubing for coolant.

End fitting 16 may comprise a suitable gasket and a sanitary stainless steel end plate with a single tapped thread for the port 18.

At the left hand end of FIG. 3(a), there is shown a 4" (101.6 mm) Viton (Trade Mark) tri-clamp gasket 44 and an end plate 46. The end plate 46 incorporates inlets/outlets 22, 24 which may be tapped into the end plate. A push fit adaptor may be provided allowing convenient connection and removal of polyethylene (PE) tubing. Inlet/outlet 24 incorporates a ½" NPT ball valve. As described hereinafter, during the process described inlet/outlet 24 is used in three different steps—(a) inflation and inert gas flushing of the reaction tube 12; (b) charging of monomer/catalyst mixture; and (c) flushing with inert gas after charging with the monomer/catalyst mixture (to clear delivery lines and provide additional insertion of the apparatus contents).

Also as described hereinafter, during the process described inlet/outlet 22 may be used as an inert gas outlet during inflation of reaction tube 12, inerting and monomer/catalyst charging; and subsequently as an inlet for inert gas (to maintain a small positive pressure inside the reaction tube 12 for the remainder of the bulk polymerisation process).

Although in the figures the apparatus is shown with the elongate axes of tubes 38, 40 of the support tube assembly 4 horizontal, it is preferred that the tubes are raised at the left hand end of FIGS. 3(a) to (d) to facilitate flow of fluids from their position of introduction and into the reaction tube 12 defined by tube 26; and to avoid loss of monomer/catalyst via port 22 during charging. Typically the angle defined by tubes 38, 40 to the horizontal is about 2 to 3° (or the gradient is about 1 in 20).

Figure 3B:
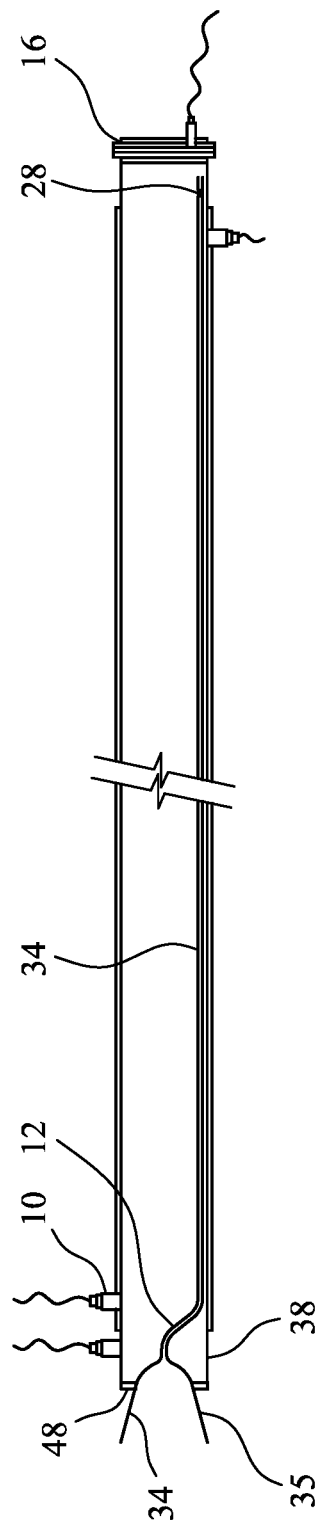
Figure 3C:
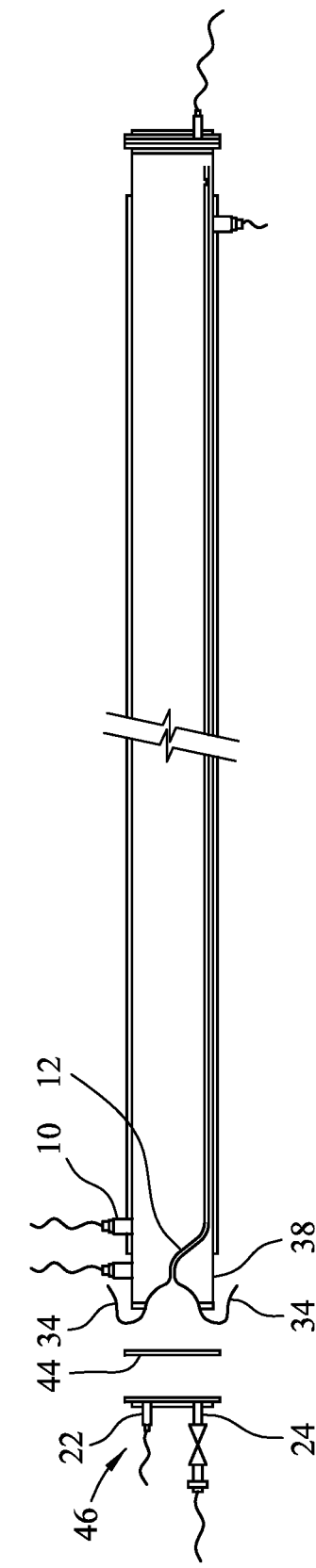
Figure 3D:
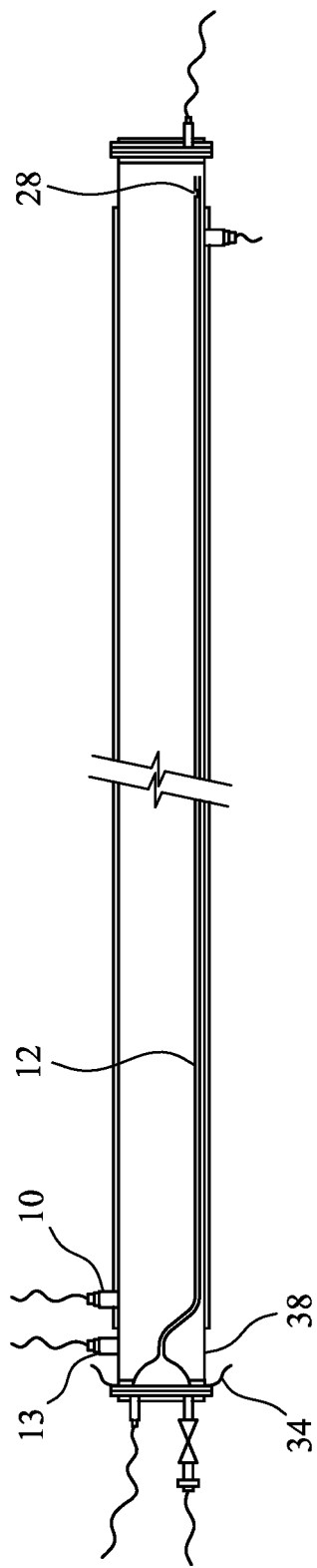

The reaction tube 12, produced from tube 26 as described in FIG. 2(d), is inserted into the inner tube 38 and pushed thereinto so its heat sealed end 28 is adjacent end fitting 16. As shown in FIG. 3(b), initially the splayed open end 35 protrudes from the inner tube 38. Next, as shown in FIG. 3(c), the splayed open end 35 is turned back over flange 48 produced on inner tube 38. Then, as represented in FIG. 3(d), gasket 44 and end plate 46 are secured in position thereby firmly (and sealingly) clamping the open end 35 in position as represented in FIG. 3(d). Note in FIG. 3(d) sanitary fitting clamps have been omitted in the interests of clarity.

As will be noted from FIG. 3(d) after insertion of tube 12 (and prior to inflation thereof) the tube is flaccid as represented in FIG. 3(d).

After assembly of the apparatus as described with reference to FIGS. 3(a) to 3(d), the apparatus may be readied for use, as described with reference to FIGS. 4(a) and 4(b), by inflating the tube 12 and inerting any region of the apparatus which may contact monomer/catalyst subsequently introduced into the apparatus, including indirect contact occurring via gas diffusion through the tube.

Figure 4A:
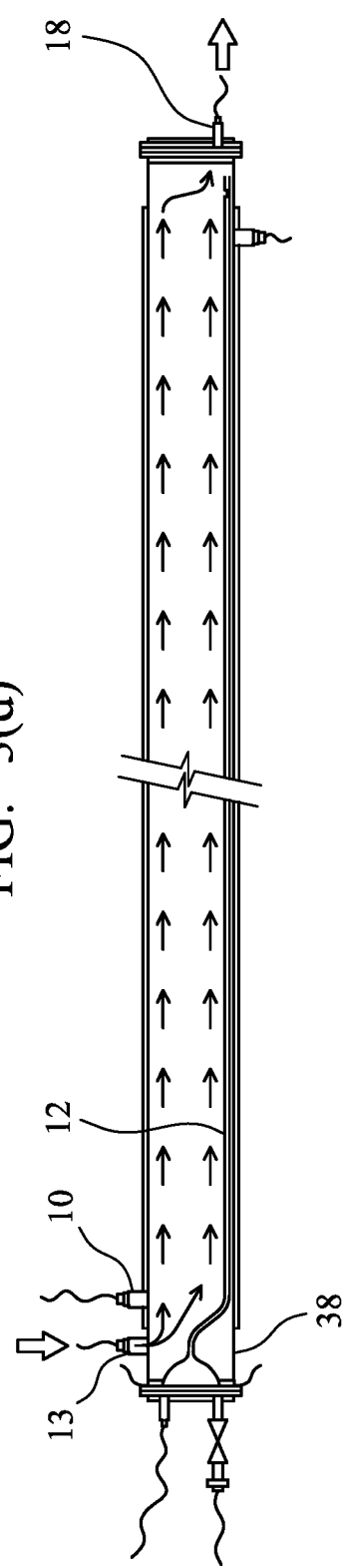
FIGS. 4(a) and 4(b) illustrate steps involved in readying the assembled apparatus of FIG. 3(d) for use in a polymerization process.

Referring to FIG. 4(a), initially the volume within the apparatus outside the tube 12 and within the inner tube 38 is inerted to a specified level (e.g. less than 0.3% vol oxygen by introduction of inert gas (e.g. nitrogen) via port inlet 13 as represented by arrows in FIG. 4(a). The inert gas exits via port 18. The oxygen content of gas exiting the inner tube 38 may be monitored at a downstream sampling point (not shown) using standard methods.

Figure 4B:
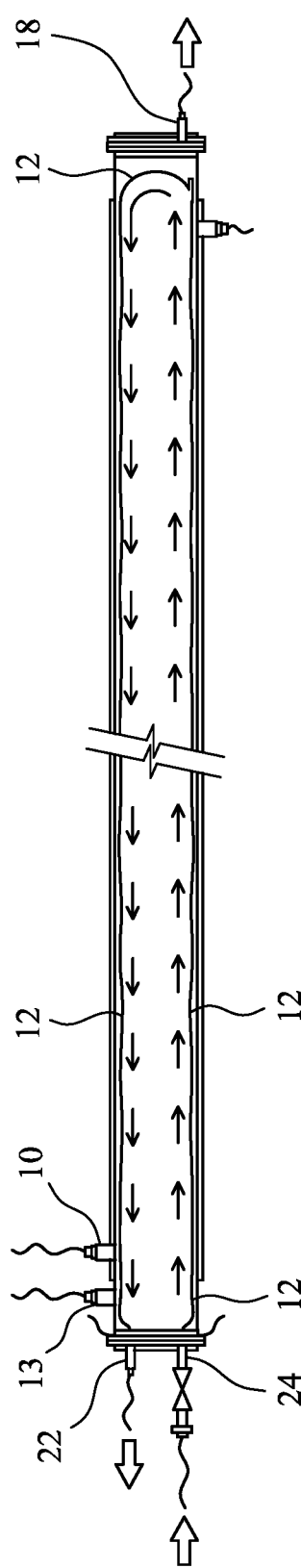

Next, the tube 12 is inflated as shown in FIG. 4(b), using an inert gas (for example nitrogen). Inert gas is passed through the tube until the inert gas exiting via port 22 has an oxygen content (e.g. of less than 0.3% vol), measured at a downstream sampling point (not shown). Inflation involves introduction of the inert gas via port 24 into the tube 12.

The gas circulates within the tube 12 to inflate it and exits via port 22. During inflation of tube 12, inert gas supply via port 13 is stopped. Inflation of tube 12 can be verified by observing gas flow from port 18, resulting from displacement of a gas volume from outside tube 12 due to inflation of the tube 12. Once inflation of the tube 12 has been completed as shown in FIG. 4(b), port 18 is temporarily closed off, while inerting of tube 12 is completed, to prevent air ingress via port 18. Port 18 is reopened prior to charging of monomer(s)/catalyst(s) to the apparatus.

As an alternative to the sequence of steps described with reference to FIGS. 4(a) and 4(b), the sequence of steps may be interchanged—e.g. the tube 12 may be inflated first and then sealed before inerting the region outside tube 12. Alternatively, the steps of FIGS. 4(a) and 4(b) could be undertaken substantially simultaneously, with a slightly higher gas pressure within tube 12 to keep it in an inflated condition.

Figure 5:
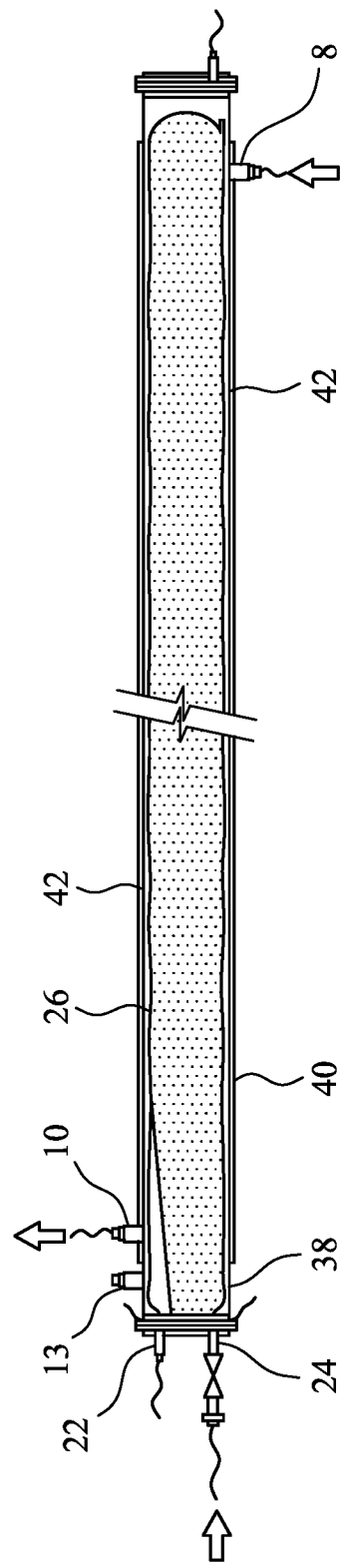
FIG. 5 illustrates the apparatus being charged for bulk polymerization.

After completion of step 4(b), the apparatus is ready to be charged with reagents and polymerisation undertaken. Referring to FIG. 5, the flow of coolant in the passageway 42 between tubes 38, 40 is progressed by introducing coolant thereinto via inlet 8 and removing coolant therefrom via outlet 10. Next, a monomer/catalyst mixture is introduced into the inflated tube 12 via port 24 thereby to fill tube 12. The polymerisation reaction is then allowed to proceed for an appropriate length of time (typically about 6 days). During this time, coolant is flowed continuously and temperature may be monitored. For example, some apparatus may include a suitably positioned thermocouple 91 (FIG. 10). In addition, a relatively low pressure (approx. 0.5 psi) of inert gas is applied via ports 22 and 13 to ensure the tube 12 (and its polymerising contents) is maintained under an inert atmosphere.

The monomer(s)/catalyst(s) mixture is suitably arranged to produce an ultra-high molecular weight polymer for use in drag reduction. The polymer may suitably be a polymer and/or copolymer of alpha-olefin(s).

Using the apparatus, polymer was prepared from 1-decene monomer, as described in Example 1.

Example 1—Production of Polymer 1-decene monomer (31.6 kg) was purged with nitrogen for 60 minutes to remove dissolved oxygen which would otherwise be poisonous to the catalyst used. The monomer was passed through a pre-treatment column containing 1.5 kg of a 50:50 mixture of 13X and 5A molecular sieves (which had been pre-dried under vacuum at high temperature). Post the pre-treatment column, the monomer was pumped to a 90 litres stirred and jacketed glass lined reactor which had previously been dried and inerted to 0.3 vol % oxygen or lower.

The 1-decene was cooled to 5° C. and then 25 wt % diethylaluminium chloride (DEAC) (80.45 g) in heptane was transferred to a Swagelok (Trade Mark) bomb within a glove box. This was then added to the 1-decene under an inert atmosphere to scavenge any residual water or protic impurities. The mixture was then stirred for 20-30 minutes in a 90 litres reactor.

Inside a glovebox, titanium trichloride aluminium activated $TiCl_3(AAD)$ (3.7888 g), was dispersed with stirring into anhydrous heptane (157.6 ml), anhydrous 1,2-dichloroethane (1.37 ml) and isobutylaluminoxane (IBAO) in heptane (3.5 wt % aluminium content in heptane) (41.4 ml) was added to the catalyst dispersion. The mixture was stirred, then transferred to a Swagelok bomb and subsequently transferred to the 90 litres reactor, whilst maintaining an inert atmosphere, to initiate the Ziegler Natta polymerisation.

It is found that, on mixing of monomer and catalyst, polymerisation is instantly initiated and thus proceeds rapidly. The mixture was then rapidly introduced using inert gas pressure to the inflated tube 12 via port 24 as described above with reference to FIG. 5.

The reaction mixture was held within tube 12, as shown in FIG. 5, at a jacket temperature of 5° C. Chilled water was flowed in passageway 42. After 24 hours, the temperature of fluid in passageway 42 was increased and the reaction continued.

During the entire process, both the outside and inside of tube 12 were kept under approximately 0.5 psi nitrogen pressure by introducing nitrogen via ports 13 and 22 to assist in restricting oxygen ingress into the polymerising mixture.

Figure 6:
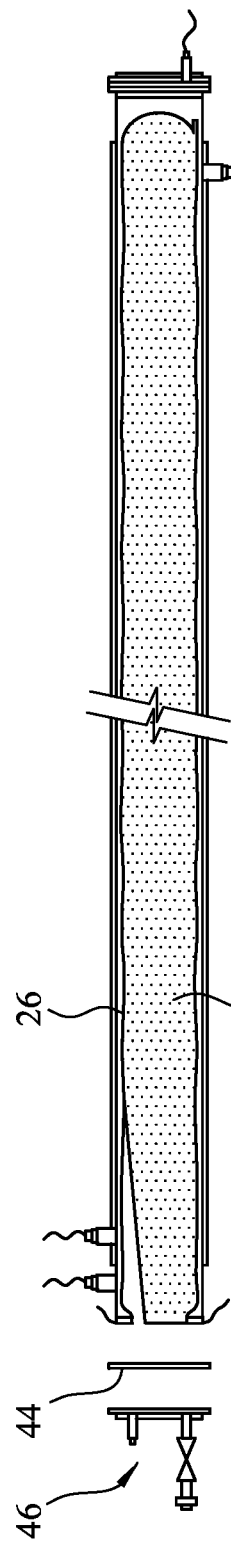
FIGS. 6 and 7 show steps in the removal of the plastic reaction tube from other parts of the apparatus.
Figure 7:
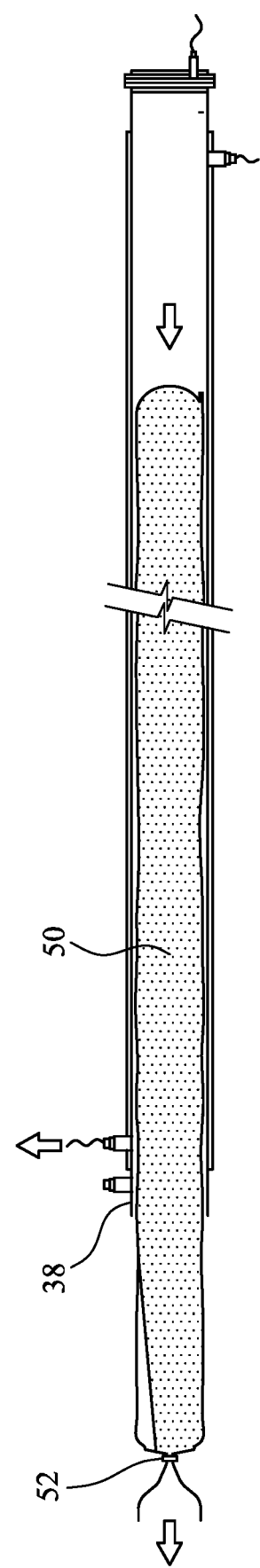
Figure 8:
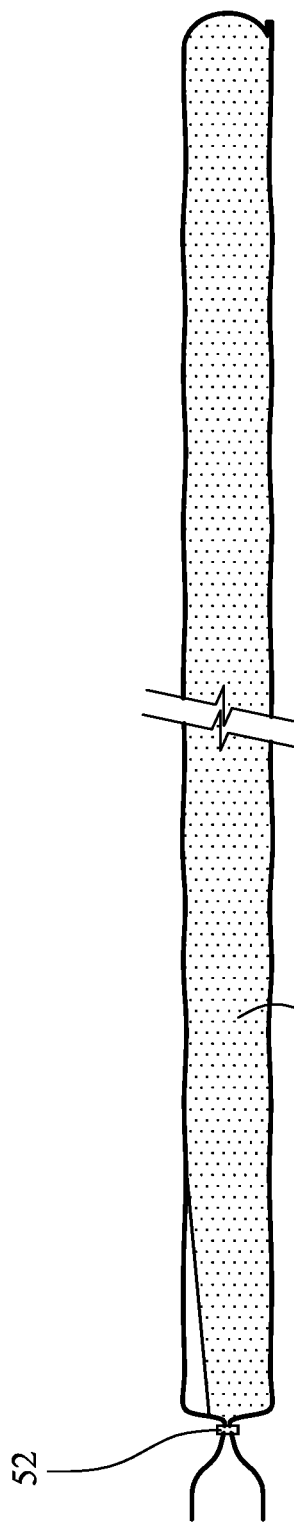
FIG. 8 shows a sealed tube containing polymer.

At the end of the aforementioned 6 days reaction time, gasket 44 and end plate 46 were disengaged as shown in FIG. 6, to provide access to the tube 12 which contained polymer 50. End plate 16 may optionally also be removed to allow visual inspection of polymer in the tube 12. The tube 12 (and polymer) were then manually withdrawn from inner tube 38, as shown in FIG. 7. During the withdrawal, the open end of tube 26 was closed by a tightly drawn cable tie 52 (or the like). Subsequently, the tube was fully removed to isolate the sealed tube 12 containing an approximately 20 feet (610 cm) log of polymer 50 as shown in FIG. 8.

Figure 9:
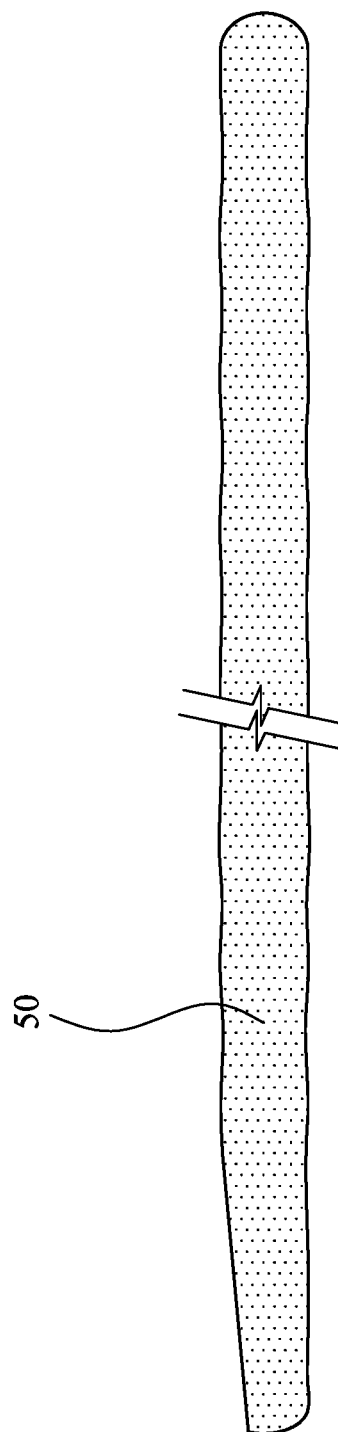
FIG. 9 shows a log of polymer removed from the reaction tube.

The tube 12 (which is made from polyethylene as described) can readily be detached, for example cut and/or peeled away from the log of polymer 50, to thereby produce an isolated log 50 of polymer, as a single piece, as shown in FIG. 9. Substantially no PE residue contaminates the polymer after removal of tube 12 which may minimise contamination of the polymer, and in turn, may be advantageous in downstream uses thereof. Whilst not wishing to be bound by any theory, the ease with which the tube can be cut away from polymer 50 may be related to the fact the polymer has a higher bulk density (approximately 0.85 g/cm$^3$) than the 1-decene (density 0.74 g/cm$^3$) starting material which means the polymer tends to shrink away from the wall of the receptacle as it is formed.

The log of polymer 50 of FIG. 9 may be processed, by known methods and contacted with a carrier to produce a formulation comprising a DRA.

Other procedures undertaken are described in Examples 2 to 7. Examples 2 to 6 describe procedures for assessing characteristics of polymers produced as described herein and results of such assessments.

Example 2—Determination of Polymer Conversion Percentage in a Polymer Produced

A disposable aluminium dish was weighed to four decimal places and the weight recorded (A). A sample of the test material (2-3 g) was placed in the dish and the combined weight of the dish and sample also weighed to four decimal places (B). The sample was dried in a vacuum oven (200° C., 0.04 Torr) for one hour, removed and reweighed. This process was repeated until constant weight (C) was achieved.

The polymer conversion percentage was calculated as follows:

$$\% \text{ conversion}=(C-A)/((B-A)*D)$$

where D is equivalent to the percentage purity of the commercial alpha-olefin monomer used/100. For example, D=0.994 for commercial 1-decene of purity 99.4%.

Example 3—Determination of Percentage Drag Reduction of Polymer Produced

Step 1—Preparation of Working Solution n-Hexane (~80 mL) was charged to a 250 mL bottle. A piece of the test polymer was sampled directly from the polymer log, as prepared in the bulk polymerisation reaction and accurately weighed to four decimal places (0.0150-0.0200 g). The polymer was then dissolved in the n-hexane by mixing for 2 days under low shear conditions, to provide a solution (A).

Solution (A) was then transferred to a clean, preweighed 500 mL bottle and accurately topped up with further n-hexane to provide a final polymer concentration of 100 mg/kg (100 ppm w/w). The sample was manually mixed, avoiding vigorous shaking, providing partially diluted solution (B).

An aliquot of solution (B) (4 g) was accurately weighed into a clean, preweighed 1000 mL bottle, then accurately topped up with further n-hexane to the target sample weight (400 g). The sample was manually mixed as above to provide working solution (C) 1 mg/kg (1 ppm w/w).

Step 2—Drag Reduction Testing Procedure

Clean, preweighed collection bottles (1000 mL) were used for collection of liquids during the test runs.

The test apparatus consisted of a 2 litre pressure vessel, fitted with charging inlet for solvent, bottom run off (used for cleaning purposes at the end of experiments), and a dip leg connected to a length of stainless steel tubing external to the vessel (7 feet length, 6.35 mm OD, 0.89 mm wall thickness). The tubing was fitted with a control valve at the outlet. The pressure vessel was further fitted with an inert gas inlet, connected to a supply line via a precision pressure control valve. This was set at a constant pressure (2.6 psi) for all experiments.

The vessel was charged with ~400 g of either working solution (C) as prepared in Step 1, or untreated n-hexane (control sample), then sealed and pressurised with inert gas (2.6 psi) with the outlet control valve closed. This valve was then opened allowing liquid to purge the external tubing, then closed (this liquid was discarded). A preweighed collection bottle (1000 mL) was placed at the outlet, then the valve reopened for 12-13 seconds to allow the liquid to flow again, recording the elapsed time using a stopwatch. The remaining liquid in the vessel was then discarded, rinsing the vessel thoroughly with untreated n-hexane (for test cycles where solution (C) was used).

The percentage flow improvement (% FI) and percentage drag reduction (% DR) were calculated from the hexane blank flow rate (F0) and the treated sample (solution (C)) flow rate (Fa) as follows:

$F0$ in g/sec=(collected weight in g)/(time valve was opened in seconds)

$Fa$ in g/sec=(collected weight in g)/(time valve was opened in seconds)

then $\% \text{ FI}=100*(Fa-F0)/F0$ $\% \text{ DR}=[(1+\% \text{ FI})^{1.9}-1]/(1+\% \text{ FI})^{1.9}$ Examples 4 to 6—Production of Polymers Using Different Catalyst Amounts Three separate bulk polymerisation reactions (Examples 4 to 6 respectively) were carried out using the apparatus described above, with 1-decene as the monomer. The synthesis procedure was identical to that described in Example 1 other than modification of the charges of TiCl$_3$(AAD), 1,2-dichloroethane, isobutylaluminoxane solution and heptane diluent, to provide different levels of catalyst loading (expressed as ppm w/w of Ti relative to the monomer charge weight). After completion of the bulk polymerisation the reaction tube comprising the polymer was removed according to the procedure above, and the polymer sampled for analysis, as described in Examples 2 and 3.

For each of the polymer products, polymer conversion percentages were determined for 10 samples, taken from different points within the polymer log. These points were selected to provide information on the consistency of polymerisation along both the long axis and the cross sectional diameter of the polymer log.

For each of the polymer products, percentage drag reduction (% DR) was determined as described in Example 3 for four samples taken from different points within the polymer log. These points were selected to provide information on the consistency of product performance characteristics along the long axis of the polymer log.

The results of these experiments are shown in Table 1.

TABLE 1

| Example No. | Catalyst (ppm w/w Ti) | % polymer conversion | | % drag reduction | |
|---|---|---|---|---|---|
| | | Average | Standard deviation | Average | Standard deviation |
| 4 | 120 | 87 | 1 | 50.49 | 1.61 |
| 5 | 100 | 87 | 1 | 49.60 | 0.81 |
| 6 | 80 | 83 | 1 | 51.62 | 0.68 |

The results show that, when bulk polymerisations were carried out using the apparatus described, products with excellent performance characteristics were obtained. The data shows that polymerisation could be successfully achieved using the apparatus, across a range of catalyst concentrations typical for this application. Furthermore, for each individual experiment the data showed excellent consistency in both chemical composition and performance characteristics, throughout the polymerised reaction volume.

Examples 7 to 9—Production of Copolymers

Three separate bulk polymerisation reactions (Examples 7 to 9 respectively) were carried out using the apparatus described above, with a monomer mixture of 1-hexene and 1-decene. The synthesis procedure was identical to that described in Example 1 (120 ppm w/w of Ti relative to the monomer charge weight) other than the selection of monomers. After completion of the bulk polymerisation the reaction tube 12 comprising the polymer was removed according to the procedure above, and the polymer sampled for analysis, as described in Examples 2 and 3.

Polymer conversion percentages and percentage drag reduction (% DR) measurements, from multiple points within the polymer log, were taken and reported in identical manner to Examples 4 to 6.

The results of these experiments are shown in Table 2.

TABLE 2

| Example No. | 1-hexene | | 1-decene | | % polymer conversion | | % drag reduction | |
|---|---|---|---|---|---|---|---|---|
| | wt % | mol % | wt % | mol % | Average | Standard deviation | Average | Standard deviation |
| 7 | 60.0 | 71.4 | 40.0 | 28.6 | 87 | 1 | 51.92 | 0.67 |
| 8 | 35.7 | 48.0 | 64.3 | 52.0 | 88 | 3 | 50.90 | 0.68 |
| 9 | 28.6 | 40.0 | 71.4 | 60.0 | 89 | 3 | 51.66 | 0.35 |

The results show that, when bulk polymerisations were carried out using the apparatus described to make copolymers, products with excellent performance characteristics were also obtained. Similarly to Examples 4 to 6, the data showed excellent consistency in both chemical composition and performance characteristics, throughout the polymerised reaction volume.

Figure 11:
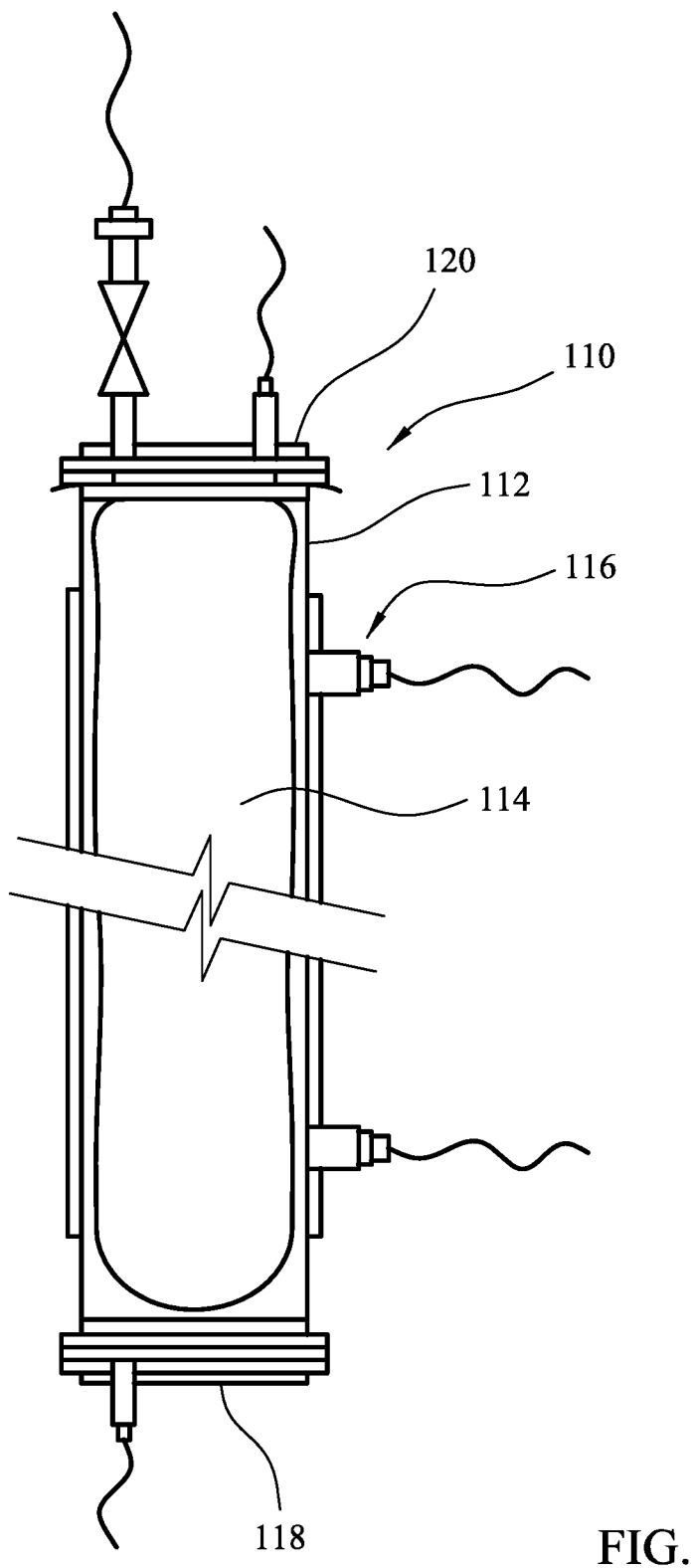
FIG. 11 is a schematic diagram of a simplified apparatus for producing a polymer.

An alternative, simplified, apparatus 110 is shown in FIG. 11. The apparatus 110 for undertaking a chemical reaction comprises an elongate housing 112 and a receptacle 114. The elongate housing 112 includes a cooling means 116 and end fittings 118, 120 which include ports via which fluids may be introduced and/or removed. In use of the apparatus 110, a chemical reaction product is formed within the receptacle 114. Subsequently, the receptacle 114 containing the chemical reaction product is withdrawn from the elongate housing 112.

Although only one apparatus 2, 110 has been described, an assembly may be provided including multiple apparatuses 2, 110 to manufacture larger amounts of polymer. Such reactors could be filled sequentially or simultaneously, optionally through the use of a manifold system.

In another embodiment, shown in FIG. 11, apparatus for carrying out a polymerisation reaction may comprise multiple assemblies, each comprising a reaction tube 2 within a rigid tube 38. The assemblies may collectively be surrounded by a single cooling jacket which is arranged to cool all of the reaction tubes concurrently. For example, two or more assemblies, each comprising a reaction tube 2 within a rigid tube 38, may be axially aligned and a single cooling jacket may envelope the tubes. In an alternative, a plurality of assemblies, each comprising a reaction tube 2 within a rigid tube 38, may be in a stacked arrangement, with a single cooling means being arranged to cool the plurality.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of assembling and/or operating an apparatus for carrying out a chemical reaction, the method comprising the steps of:
   (i) selecting a housing in which a precursor of a receptacle is arranged; and
   (ii) introducing a fluid (F1) into said precursor of said receptacle to cause the precursor to distend (e.g. inflate) to define a distended receptacle for receiving reagents for reaction in the apparatus.

2. The method according to claim 1, wherein, in step (i), the precursor of said receptacle is substantially flaccid.

3. The method according to claim 1, wherein said housing has a volume in which said precursor of the receptacle is arranged wherein, in the combination described in step (i), said precursor of the receptacle occupies less than 70% of said volume.

4. The method according to claim 1, wherein:
said housing supports said precursor of said receptacle and/or said distended receptacle;
said housing is elongate and, in the combination described in step (i), length (L) of the precursor of the receptacle extends at least 60% along the elongate extent of an internal region of the housing in which said precursor of said receptacle is arranged; and
said housing is elongate and includes securement means for releasably securing said precursor and/or distended receptacle in position.

5. The method according to claim 1, wherein, in the combination described in step (i), said precursor of the receptacle is secured in position relative to the housing and said precursor of said receptacle comprises a plastic material which comprises optionally-substituted alkylene units.

6. The method according to claim 1, wherein said receptacle includes a first end and a second end which are spaced apart along the elongate extent of the receptacle, wherein said first end is a closed end.

7. The method according to claim 1, wherein the length of the receptacle is the linear distance between a first end and a second end thereof, wherein the diameter of the receptacle is substantially constant for at least 80% of the distance from the first end towards said second end; and wherein a region of the receptacle adjacent said second end diverges so an opening of the receptacle at said second end has a greater diameter than a region of the receptacle inwards of the second end.

8. The method according to claim 6, wherein the precursor of the receptacle includes no seams between said first and second ends.

9. The method according to claim 1, wherein the diameter of the receptacle is in the range of 1 cm to 45 cm across its entire extent; and/or the length of the receptacle is in the range of 3 m to 15 m and/or the volume of the receptacle is in the range of 4000 $cm^3$ to 0.5 $m^3$.

10. The method according to claim 1, wherein the method comprises clamping the precursor of said receptacle in position, in order to define the combination described in step (i).

11. The method according to claim 1, wherein step (ii) comprises introducing an inert fluid (F1) into said precursor of said receptacle to cause the precursor of said receptacle to distend and define a distended receptacle, wherein, optionally, the method comprises introducing said inert fluid (F1) so it flushes fluid from the precursor of said receptacle so that the level of oxygen within the distended receptacle after introduction of said fluid (F1) is less than a predetermined level.

12. The method according to claim 1 which comprises a step (iii) which comprises introducing a fluid (F2) into the housing between a wall of said housing and an outer surface of the precursor of said receptacle and/or said distended receptacle.

13. The method according to claim 1, wherein said housing includes cooling means for cooling reagents and polymer contained in the apparatus in use.

14. The method according to claim 1, wherein said elongate housing comprises a first elongate tube in which said precursor of said receptacle is positioned, wherein after step (ii) said distended receptacle contacts an internal surface of the first tube, wherein at least 60% of the area of an external wall area of said distended receptacle contacts said internal surface.

15. The method according to claim 14, wherein said elongate housing comprises a second elongate tube which is coaxial with said first tube and said first tube is positioned within the second tube, said first and second tubes being radially spaced apart so an annular gap is defined between the first and second tubes, wherein said annular gap defines a fluid passage for a coolant fluid and, optionally, the annular gap extends around substantially the entirety of the first elongate tube so that coolant fluid can contact at least 70% of the first elongate tube in use thereby to cool the first elongate tube.

16. The method according to claim 15, wherein said first and second tubes are cylindrical.

17. The method according to claim 1, wherein, in the method, a same port is used at different times to introduce both a fluid (F1) into said precursor of said receptacle to cause it to distend and subsequently to deliver reagents into the distended receptacle.

18. The method according to claim 1, wherein apparatus used in the method includes cooling means which includes a container (C1) for containing a cooling fluid, the method comprising delivering coolant fluid from the container (C1) to a region outside said distended receptacle and/or outside a reagent-containing receptacle; and wherein said apparatus includes a container (C2) for containing a monomer, the method comprising delivering monomer into the distended receptacle; and wherein said apparatus includes a container (C3) for containing a catalyst, wherein the method comprises delivering catalyst into the distended receptacle.

19. The method according to claim 18, wherein containers (C2) and (C3) are arranged to deliver monomer and catalyst respectively to a mixing region where they are contacted and mixed, wherein the mixing region is upstream of said distended receptacle.

20. The method according to claim 1, which includes a step (iv) which comprises introducing reagents for preparation of a polymer into said distended receptacle, wherein the total weight of reagents introduced into said distended receptacle is at least 1000 g, wherein said polymer prepared is selected from the group comprising: poly(alpha-olefin), polychloroprene, vinyl acetate polymers and copolymers, poly(alkylene oxide) (PAO), and mixtures thereof.

21. The method according to claim 20, the method comprising undertaking a reaction for a time of at least 10 hours and, subsequently, includes a step of removing a receptacle containing polymer from said housing.

22. The method according to claim 1, wherein a polymer is prepared in said method and the method comprises withdrawing a receptacle containing polymer from the housing and subsequently engaging a new precursor of a said receptacle with said housing and producing a polymer in the new precursor of said receptacle.

23. An apparatus for carrying out a polymerisation reaction to produce a drag reducing polymer, said apparatus comprising a housing in which a distended receptacle is arranged, wherein said distended receptacle is arranged to receive reagents for reaction in the apparatus, wherein said distended receptacle includes a fluid (F1) which is contained within the distended receptacle and/or which causes distension; said apparatus includes a container (C1) for containing a coolant fluid, wherein the apparatus is arranged for delivery of coolant fluid from the container (C1) to a region outside the distended receptacle; said apparatus includes a container (C2) for containing a monomer, wherein the apparatus is arranged for delivery of monomer into the distended receptacle; wherein said apparatus includes a container (C3) for containing a catalyst, wherein the apparatus is arranged for delivery of catalyst into the receptacle; the apparatus includes a mixing device for mixing monomer and catalyst upstream of said distended receptacle; and the volume of the distended receptacle is in the range of 4000 cm³ to 0.5 m³.

24. A method of assembling and/or operating an apparatus for carrying out a chemical reaction, the method comprising the steps of:
  (i) selecting a housing in which a precursor of a receptacle is arranged; and
  (ii) introducing a fluid (F1) into said precursor of said receptacle to cause the precursor to inflate to define an inflated receptacle for receiving reagents for reaction in the apparatus;
  wherein said housing has a volume in which said precursor of the receptacle is arranged wherein, in the combination described in step (i), said precursor of the receptacle occupies less than 70% of said volume;
  said housing is elongate and, in the combination described in step (i), length (L) of the precursor of the receptacle extends at least 90% along the elongate extent of an internal region of the housing in which said precursor of said receptacle is arranged;
  said precursor of said receptacle comprises a plastic material;
  wherein the length of the receptacle is the linear distance between a first end and a second end thereof, wherein the diameter of the receptacle is substantially constant for at least 80% of the distance from the first end towards said second end;
  wherein the diameter of the receptacle is in the range of 1 cm to 45 cm across its entire extent; and/or the length of the receptacle is in the range of 3 m to 15 m;
  wherein step (ii) comprises introducing an inert fluid (F1) into said precursor of said receptacle to cause the precursor of said receptacle to inflate and define an inflated receptacle;
  wherein said housing includes cooling means for cooling reagents and polymer contained in the apparatus in use;
  wherein apparatus used in the method includes cooling means which includes a container (C1) for containing a cooling fluid, the method comprising delivering coolant fluid from the container (C1) to a region outside said distended receptacle and/or outside a reagent-containing receptacle; and wherein said apparatus includes a container (C2) for containing a monomer, the method comprising delivering monomer into the distended receptacle; and wherein said apparatus includes a container (C3) for containing a catalyst, wherein the method comprises delivering catalyst into the distended receptacle; and
  wherein containers (C2) and (C3) are arranged to deliver monomer and catalyst respectively to a mixing region where they are contacted and mixed, wherein the mixing region is upstream of said distended receptacle.

* * * * *